United States Patent [19]
McCracken et al.

[11] Patent Number: 5,488,972
[45] Date of Patent: Feb. 6, 1996

[54] BALL VALVE COUPLING

[75] Inventors: Donald G. McCracken, Horton; David G. Zander, Parma, both of Mich.

[73] Assignee: Aeroquip Corporation, Maumee, Ohio

[21] Appl. No.: 387,443

[22] Filed: Feb. 13, 1995

[51] Int. Cl.$^6$ ..................................................... F16L 37/28
[52] U.S. Cl. .............................. 137/614.06; 137/614.01
[58] Field of Search ........................... 137/614.06, 614.01; 251/149.2, 149.6, 149.9, 314, 315.01, 315.16

[56] References Cited

U.S. PATENT DOCUMENTS

| | | |
|---|---|---|
| 2,016,577 | 10/1935 | Pearson . |
| 2,872,216 | 2/1959 | Kaiser . |
| 3,159,180 | 12/1964 | Courtot et al. ............... 137/614.06 |
| 4,335,747 | 6/1982 | Mitsumoto et al. . |
| 4,429,711 | 2/1984 | Schomer . |
| 4,438,779 | 3/1984 | Allread . |
| 4,577,659 | 3/1986 | Gembus et al. ............... 137/614.06 |
| 4,637,640 | 1/1987 | Fournier et al. . |
| 4,647,082 | 3/1987 | Fournier et al. . |
| 4,664,149 | 5/1987 | Fremy . |
| 4,793,637 | 12/1987 | Laipply et al. . |
| 5,083,588 | 1/1992 | Truchet . |
| 5,095,946 | 3/1992 | McLennan . |
| 5,099,883 | 3/1992 | Maiville . |
| 5,188,335 | 2/1993 | Pettinaroli . |
| 5,332,001 | 7/1994 | Brown . |
| 5,402,825 | 4/1995 | McCracken ............... 137/614.06 |

FOREIGN PATENT DOCUMENTS

| | | |
|---|---|---|
| 0572931 | 12/1993 | European Pat. Off. . |
| 3602775 | 3/1991 | Germany . |
| 4119089 | 6/1994 | Germany . |
| 815370 | 6/1959 | United Kingdom . |

*Primary Examiner*—Martin P. Schwadron
*Assistant Examiner*—Kevin L. Lee
*Attorney, Agent, or Firm*—Emch, Schaffer, Schaub & Porcello Co.

[57] ABSTRACT

This invention relates to an environmental coupling that reduces spillage to less than 1 mL. The coupling includes a first convex ball valve and a second concave ball valve. One ball valve includes flat surfaces on the ball and a retainer with "flats" that correspond to the "flats" on the ball valve. This feature keeps the ball valve on centerline and allows valve actuation without damage to either ball valve. The coupling also provides other numerous safeguards against spillage. For instance, the coupling has handles with concave and convex edges to prohibit the wrong sequencing of opening and closing the ball valves, interlocking means to prevent the uncoupling of the annular bodies of the ball valves when the first ball valve is in the open position, and a handle button release and secondary handle lock.

18 Claims, 7 Drawing Sheets

BALL VALVE COUPLING

TECHNICAL FIELD

This invention relates to ball valves for fluid couplings. More specifically, the invention relates to improved ball valve design and improved seals therefor.

BACKGROUND ART

Fluid couplings, such as the type commonly found on the end of flexible hoses often use ball valves. The flow passage of a coupling or fitting houses the ball valves. Rotating 90° fully opens or closes the valves. Closing the ball valves before disconnecting the coupling provides low spillage or zero spillage of fluid, typically a hydrocarbon. When the couplings join together, each ball valve rotates to a position which permits flow. Before the couplings separate, each ball valve rotates to a flow preventing position. The ball valves interfit with one another so that a minimum volume of fluid is lost when the couplings separate.

One improvement in ball valve design has been a semi-spherical depression in one ball valve with the other ball valve resting in the depression. This is a concave/convex ball valve design. Another improvement is a coupling that reduces spillage to less than 1 mL. In addition, the coupling provides numerous safeguards against spillage. The handle design prohibits incorrect sequencing of the ball valves during opening and closing. Another feature of the ball valves is an interlocking means which prevents the coupling from being disconnected until both valves are fully closed. The convex ball must be opened first by turning the ball 90°. The concave ball then can be opened. Closing the valves require turning the concave ball first, then turning the convex ball, Handles are designed to prohibit wrong sequencing of opening and closing. Each handle also includes redundant safety locks which prevent the valve from opening when the valve halves are uncoupled.

DISCLOSURE OF INVENTION

This environmental coupling improves the concave ball half by providing:
  a floating concave ball half;
  flat surfaces on the ball; and
  a retainer which mates to the flat surfaces on the floating concave ball.

The retainer and flat surfaces allow proper connection between the two valves. The retainer and flat surfaces also prevent the concave ball from cocking or tilting when mating the balls. The ball can only rotate from an opened to closed position. In addition, the ball seal in the concave half is different. The new ball seal (seat) has multiple sealing nibs on the ball seal.

By definition, a floating ball design means that in the closed and disconnected position, the ball is free to move toward the seat. The fluid pressure and pressure from the wave spring acts on a large portion of the ball forcing it into the seat. Ball valves commonly use this concept. Applying this concept to a metal convex/concave low spill coupling requires the concave ball to be nearly perfectly aligned with the convex ball. Our unique feature is that we have a retainer with mating surfaces that engage with the corresponding flat surfaces on the ball. This feature keeps the ball on centerline and allows valve actuation without damage to either ball even if the two balls are touching, which is usually the case for low spill couplings.

The spring energized ball seal used with the trunnion mounted ball (concave ball half) of an earlier design would fail during valve closure and certain flow conditions. Changing to a floating ball arrangement with a solid teflon seat, identical to the convex ball half, corrected this condition.

Ball seals were unable to seal at high and low temperature extremes because the static seal nib in the metal body had a different thermal coefficient of expansion than the teflon seal. This dimensional variation distorted the ball seat at low temperatures causing leakage. Removing the metal nib from the body and adding two small sealing nibs to the heel side of the seal, allowed the seal to move relative to the body, without distorting the ball seat.

During endurance testing, the concave ball would cock or tilt sufficiently to prevent proper mating with the convex ball. This resulted in rubbing, scratching and galling between the two balls. The addition of a special teflon retainer with two flat surfaces that engage with corresponding flat surfaces on the ball, keeps the concave ball centered to allow proper connection between the two halves. This is an important addition, because to maintain low spillage, we must have near zero clearance between the two balls. If the concave ball is not on centerline, damage will occur when the valves are actuated.

BEST MODE OF CARRYING OUT INVENTION

The preferred embodiment of our fluid coupling employs a fluid, ball valve coupling comprising a first annular body defining a passage therethrough, a first ball valve rotatably mounted within the passage, the first ball valve including a spherical exterior surface and a bore extending therethrough, means for rotating the first ball valve between an open position when the bore is in alignment with the passage and a closed position when the bore is transversely disposed to the passage; a second annular body defining a passage therethrough, a second ball valve rotatably mounted within the passage, the second ball valve including a spherical exterior surface and a bore extending therethrough, means for rotating the second ball valve between an open position when the bore is in alignment with the passage and a closed position when the bore is transversely disposed to the passage; a means for coupling the annular bodies; and wherein a portion of the spherical exterior surface of the second ball valve is flat and a portion of the retainer is flat wherein the flats are located adjacent to each other allowing the second ball valve to rotate between the open and closed position, but preventing the second ball valve from otherwise moving in the passage of the second annular body. This design of the concave ball and retainer prevents interference with the convex ball in the process of connecting the two halves.

The second ball valve more preferably has at least two flat surfaces and the retainer has at least two flat surfaces wherein each flat of the retainer is adjacent a flat on the second ball valve. The second ball valve more preferably has two flat surface 180° apart and the retainer is circular and has two flat surfaces 180° apart wherein each flat of the retainer is adjacent a flat on the second ball valve.

Preferably, the second ball valve is a concave ball valve and the first ball valve is a convex ball valve, ,wherein the concave ball valve having a semi-spherical depression in the spherical exteriors surface thereof wherein the convex ball valve fits inside the semi-spherical depression when the ball valves are in the closed position. Preferably, the second annular body has a coupling end and the retainer is located on the opposite side of the second ball valve away from the coupling end. The passage in the second annular body also includes a ball seal that has multiple sealing nibs. Preferably, the ball seal is a circular seal that has two sealing nibs. Typically, the ball seal is located in the passage between the concave ball valve and the coupling end.

In addition to the flat concave ball design, flat retainer and sealing nibs, preferred additional features of our design include a handle design which presents incorrect valve sequence; interlock to prevent disconnections of valve halves when either valve is open; and handle button releases and secondary handle lock on each handle. The features co-operate with each other to prevent spillage, especially during coupling and uncoupling the ball halves. Essentially, our design approaches zero spillage, i.e. less than 1.0 mL.

The first feature of our coupling is the concave/convex ball design where a spherical convex ball nest in the concave ball when both balls are closed. The convex ball must be first opened by turning the ball 90°. The concave ball then can be opened.

The second feature of our coupling is the concave/convex design of each handle. The geometry of each handle is such that a portion of each handle is convex and concave. When the valve is closed, the convex portion of the handle on the convex ball fits in the concave portion of the other handle, i.e. the handle on the concave ball valve. As a result, the first handle must be opened before the second handle can be opened. In the open position, the concave portion of the first handle fits over the convex portion of the second handle. This geometry demands that the first handle be opened first and closed last and that the second handle be opened second and closed first.

Except for the flat retainer, ball seal nibs and the two ball halves, the coupling is connected with conventional fittings and seals. The coupling halves are connected by axially extending headed projections received within complementary shaped lipped recesses, both have arcuate form and are concentrically related to the axis of the coupling halves. Reception of the projections into the recesses and relative rotation of the coupling halves about their longitudinal axis interlocks the coupling halves with a 90° rotation. The 90° rotation between the coupling halves must be achieved to produce a fully coupled relationship.

Another feature is an interlock that prevents uncoupling when the valves are open or flowing. After the halves are coupled and the first handle is opened, a shaft attached to the first handle engages the interlock and slides it into a recess in the second half of the coupling. The engagement between the handle shaft and the interlock preferably is a rack and pinion design. Although other enlargement mechanisms may be used and will be understood by those versed in the art.

A further embodiment is a handle button release and secondary handle lock on each handle. These features guard against spillage when the coupling halves are uncoupled or coupled. For example, when the two coupling halves are uncoupled, both the button release and the handle lock must be depressed in order to open the valve. Other mechanisms are possible and will be understood by those versed in the art. This arrangement makes it extremely difficult to accidentally open either valve. One must consciously depress each feature in order to open the valve. We prefer to have these safety guards on both handles as the flow of hydrocarbon material through the valves can be in either direction.

Another feature is that when coupling halves are connected, protrusions on each coupling half disengage the secondary handle lock on the other coupling half. This however is only achieved when the bayonet type connections are in the fully coupled position. Please note that secondary handle locks on each handle are still in place and that the handles still cannot open the valves to the flow position until the handle button releases are fully depressed.

Finally, the handle button releases can be depressed and each handle can be turned to the fully opened position. However, because of the geometry of the handles, the first handle must be opened first and the second handle opened last. The handles lock into the open position when the handles are turned 90°. The handle locks are spring loaded and release into a depression at the 90° position. In this position, two features prevent the valve from being uncoupled. They are the interlock between the valve halves and the first and second handle interference on each handle.

Other features include a separate flange at the interface between the valve halves. This flange prevents galling between the valve halves from constantly coupling and decoupling the valve halves. When the flange begins to wear or corrode, it can be replaced without having to replace the entire coupling.

Figure 1:
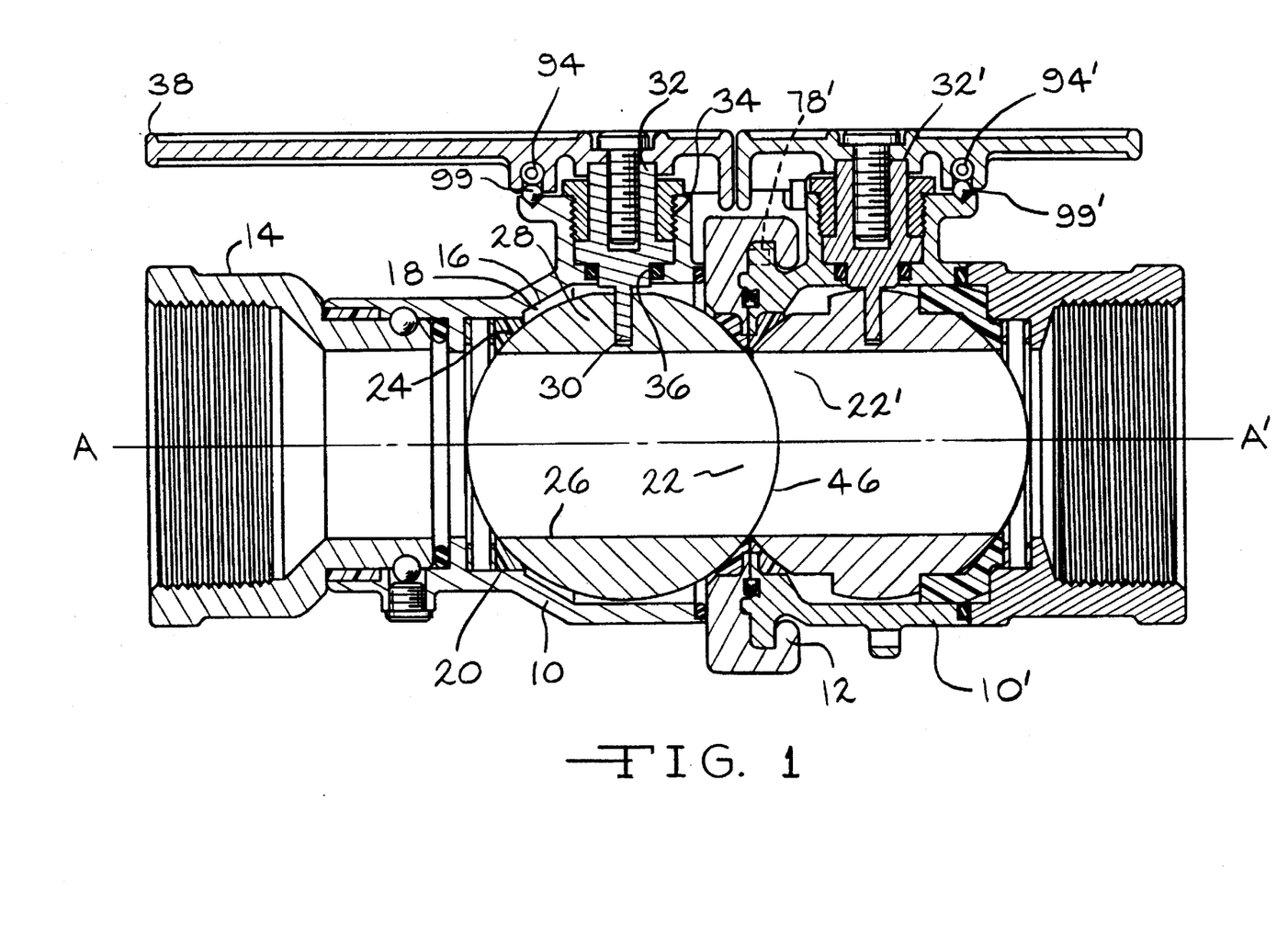
FIG. 1 shows the fluid coupling of this invention with the concave/convex ball valves in the open position.

FIG. 1 shows the ball valves in the open position. The coupling halves are identical in most respects. For this reason, identical reference numerals and primers are used where appropriate. The coupling includes annular body 10 having flange connection end 12, and swivel coupling end 14. The body 10 includes passage 16 which intersects the ends, and an annular valve seat is defined within the passage concentric thereto by spherical surface 18, and a retainer 20.

A ball valve 22 is rotatably mounted within the passage 16 and includes a spherical exterior surface 24 and a diametrical bore 26 which extends therethrough. As will be appreciated, the valve seat spherical surface 18 and retainer 20 engages the ball valve surface.

Ball valve 22 defines slot 28 which receives head 30 of ball valve actuator 32. The wall of body 10 defines bore 34 and seal 36 seals bore 34. Actuator 32 includes handle 38 disposed adjacent the exterior of body 10 as to be exteriorly accessible. When handle 38, ball valve 22 and bore 26 are at a position 90° to axis A–A', ball valve 22 is closed. Rotating handle 38, ball valve 22 and bore 26 clockwise 90° to a position parallel with axis A–A' opens ball valve 22. Bore 26 then is aligned with axis A–A' and permits unrestricted fluid flow through body 10.

Actuator 32 also includes exterior top section 40. Handle 38 extends from top section 40. Top section 40 is of a particular geometry and includes convex edge 42 and concave edge 44. When the valves are closed, handle 38 and 38' are perpendicular to axis A-A' in opposite directions, i.e., disposed 180°. Convex edge 42 is adjacent concave edge 44'. By this geometry, handle 38 has to be opened before handle 38' can be rotated.

Figure 2:
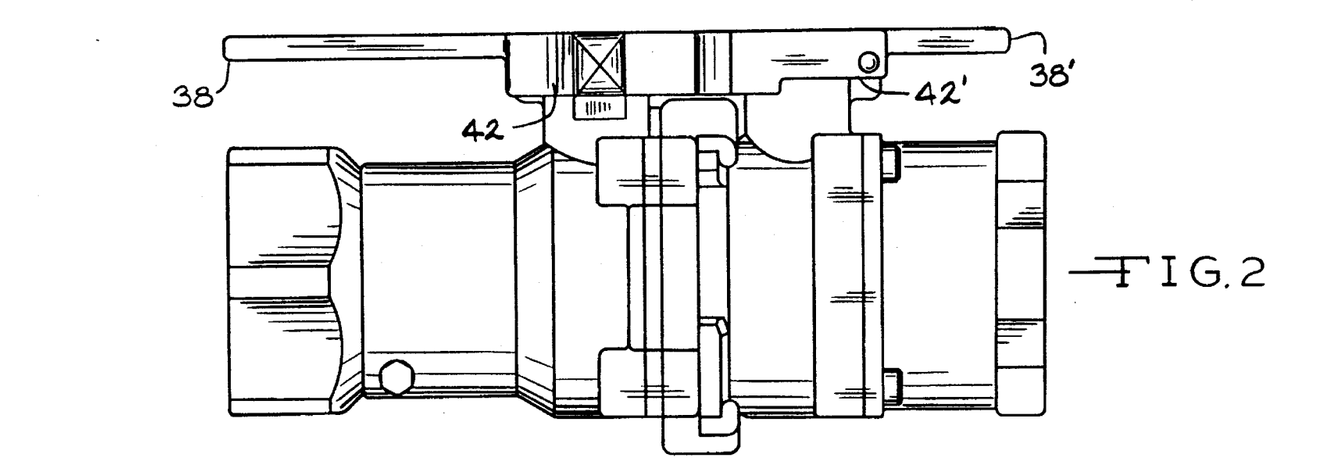
FIG. 2 is a side view showing the handles of this invention in the open position.
Figure 3:
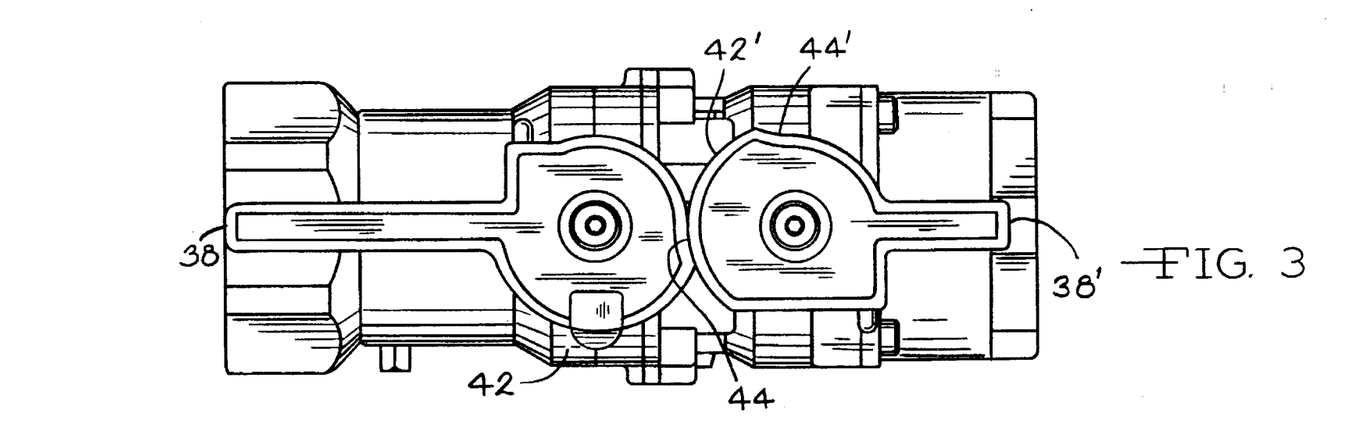
FIG. 3 is a top view showing the handles in the open position.

FIGS. 2 and 3 show handles 38 and 38' in the open position. In the open position, both handles have been rotated clockwise 90° and are parallel to axis A-A'. Concave edge 44 now is adjacent convex edge 42'. To close the valves, handle 38' must rotate counter clockwise 90° first and then handle 38 can rotate counter clockwise 90° to close.

Ball valve 22 is completely spherical except for bore 26 therethrough. Ball valve 22' is spherical except for concave depression 46. Depression 46 is disposed 90° to bore 26'. When the coupling halves are connected and the valves are in the closed position, valve 22 nests or rests in depression 46 of valve 22'.

The geometry of the ball valves complements the geometry of top section 40 and 40' and cooperate to provide the proper sequencing of operation. If the sequence is not followed, top sections 40 and 40' and valves 22 and 22' interfere with each other and prevent rotating.

Figure 4:
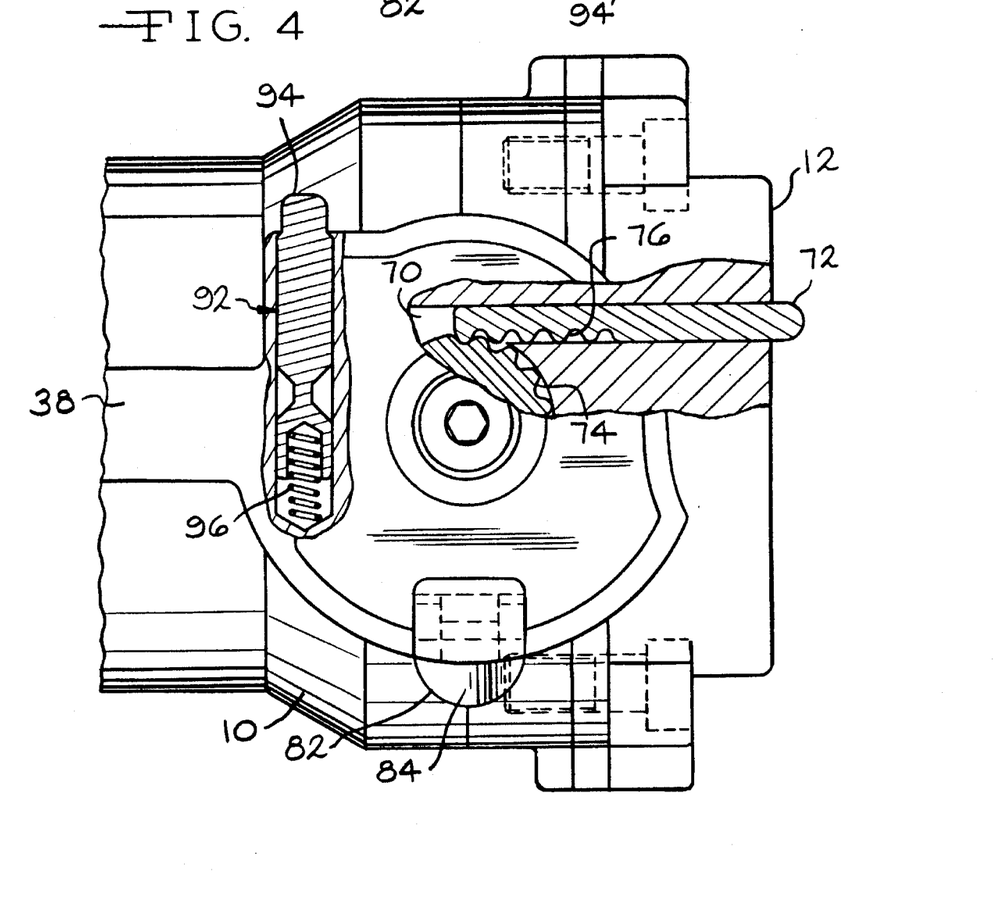
FIG. 4 is an enlarged view of the first handle of this invention.
Figure 5:
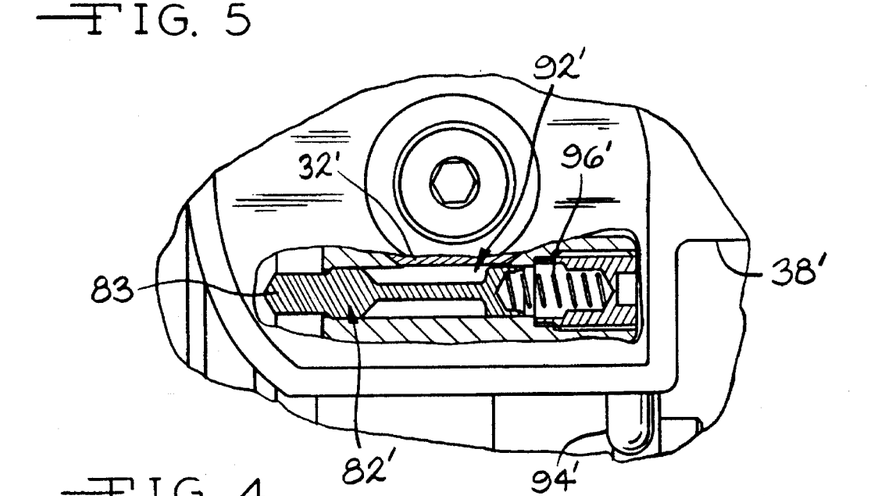
FIG. 5 is an enlarged view of the second handle of this invention.

FIG. 4 and 5 show body 10 houses bore 70 and pin 72 slideably mounts within bore 70. Actuator 32 and pin 72 engage each other in a rack and pinion fashion. Actuator 32 includes teeth 74 which matedly engage teeth 76 at the base of pin 72. When handle 38 rotates to the closed position, teeth 74 pull pin 72 away from body 10'. When handle 38 rotates to the open position, teeth 74 push pin 72 towards body 10'. Pin 72 thereby engages recess 78' in housing 10'. In this way, bodies 10 and 10' cannot be uncoupled once handle 38 rotates to the open position.

A further embodiment of this invention is handle button releases 94 and 94' and secondary handle locks 82 and 82' on each handle.

Button releases 94 and 94' engage the bodies 10 and 10' by way of balls 99 and 99'. Springs 96 continually bias pins 94 and 94' toward the top surface of bores 92.

When handle 38 is in the closed position and disconnected, latch 84 engages recess 90 in body 10 and prevents handle 38 from rotating.

Secondary handle lock 82' operates in much the same fashion. Handle lock 82' includes bore 92' which houses pin 83. Spring 96' bias pin 83 toward rib of housing 10'. When lug of flange connection end 12 engages pin 83 upon connection, actuator 32' can be rotated to the open or closed positions upon disconnection of bodies 10 and 10'. The spring 96' pushes pin 83 forward, preventing actuator 32' from turning. The entire design makes it extremely unlikely that a valve will accidentally open thereby preventing spillage.

Figure 6:
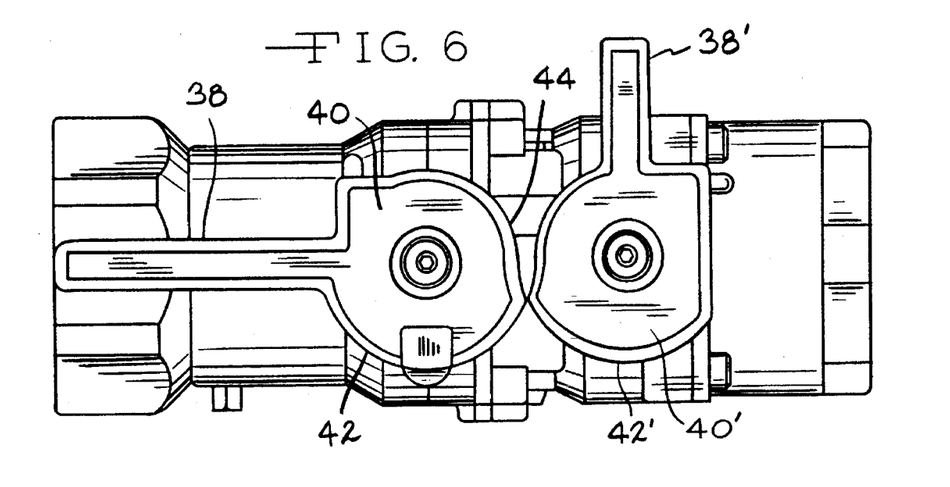
FIG. 6 shows the first handle in the open position and the second handle in the closed position.
Figure 7:
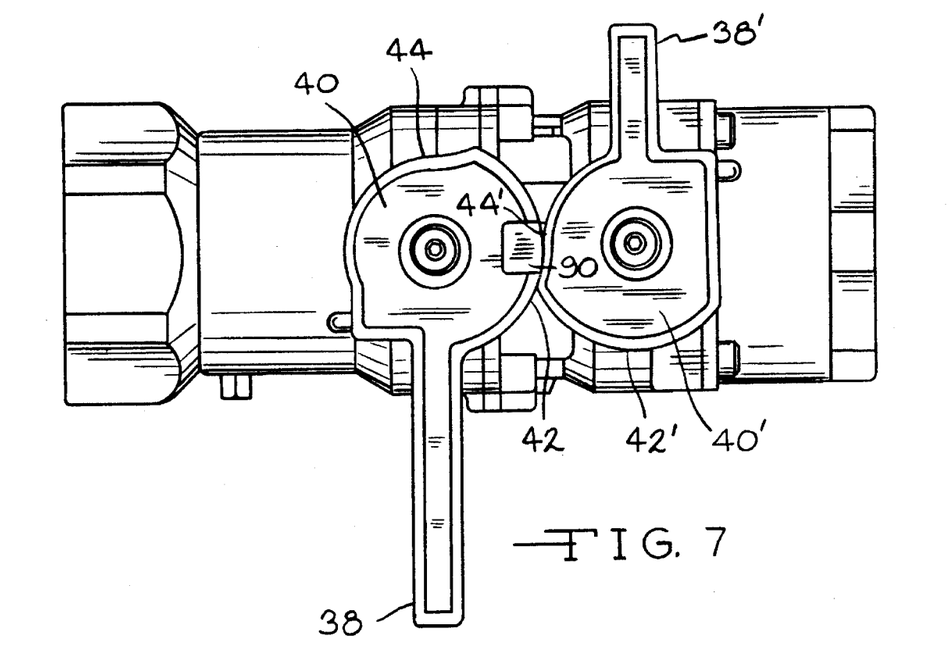
FIG. 7 shows the handles in the closed position.

FIG. 6 shows handle 38 in the open position and handle 38' in the closed position. FIG. 7 shows handle 38 and handle 38' in the closed position. The coupling of this invention may be made from any material including metals and non-metals. Typically, the couplings are made of stainless steel.

Figure 8:
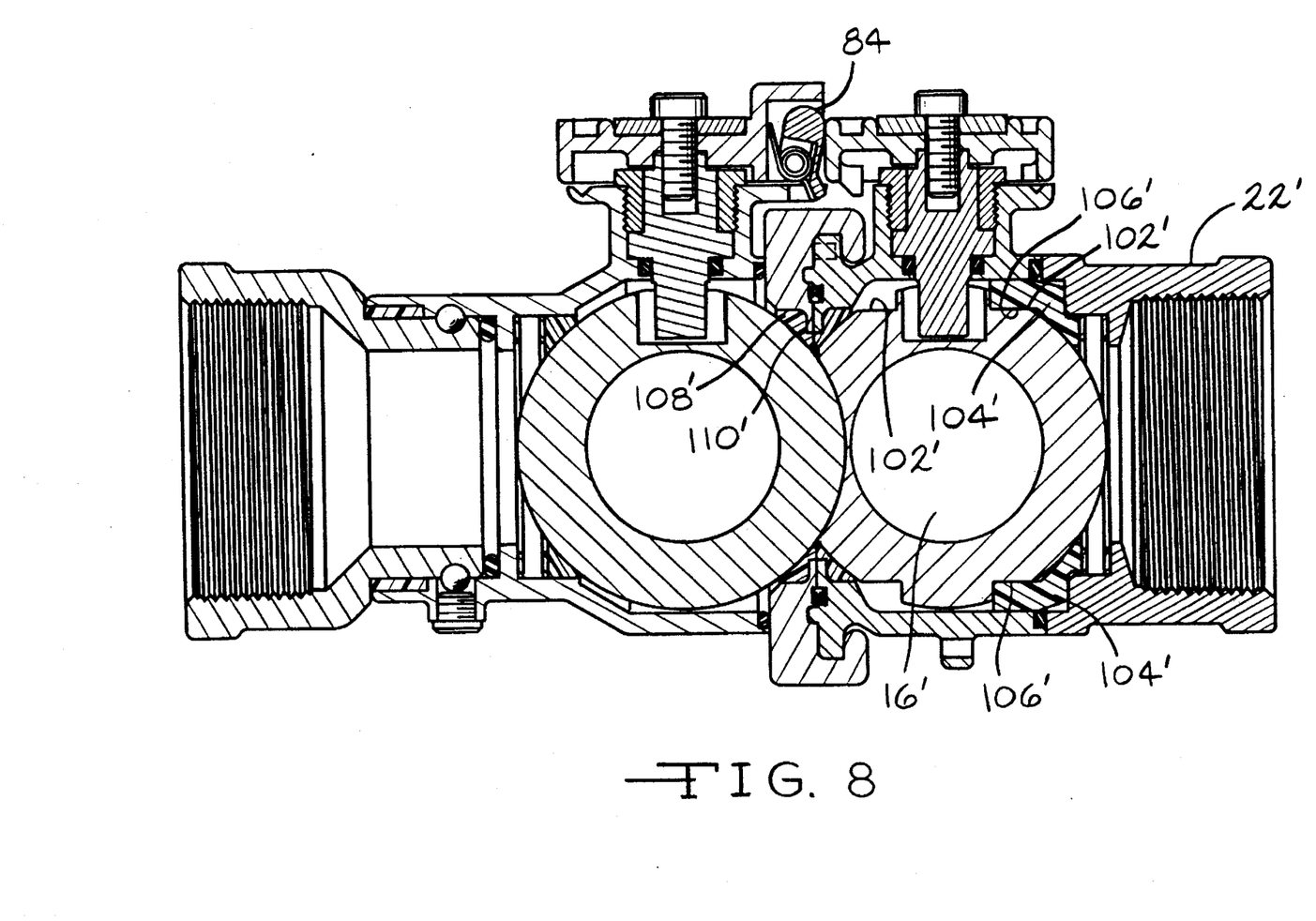
FIG. 8 shows the ball valves in the closed position.

FIG. 8 shows the convex/concave ball valves in the closed position. It also shows concave ball valve 22' with flats surfaces 102'. Also shown in passage 16' is retainer 104' with flat surfaces 106'. The "flats", i.e. surfaces 102' and surfaces 106' are adjacent or correspond to each other. Also shown is seal 108' with sealing nibs 110'.

Figure 9:
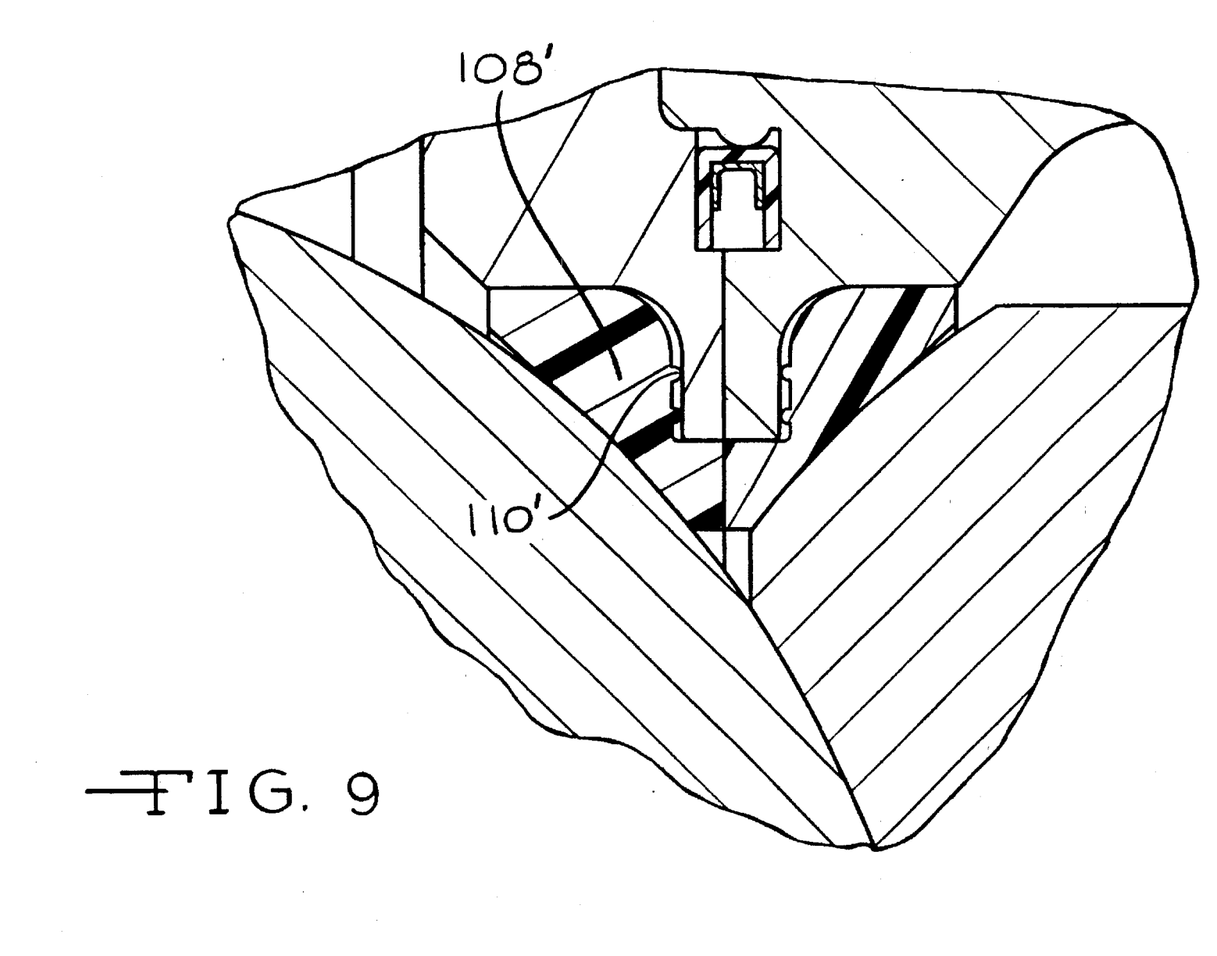
FIG. 9 is a view of the ball seal with nibs of this invention.

FIG. 9 shows ball seal 108' with sealing nibs 110' in greater detail.

Figure 10:
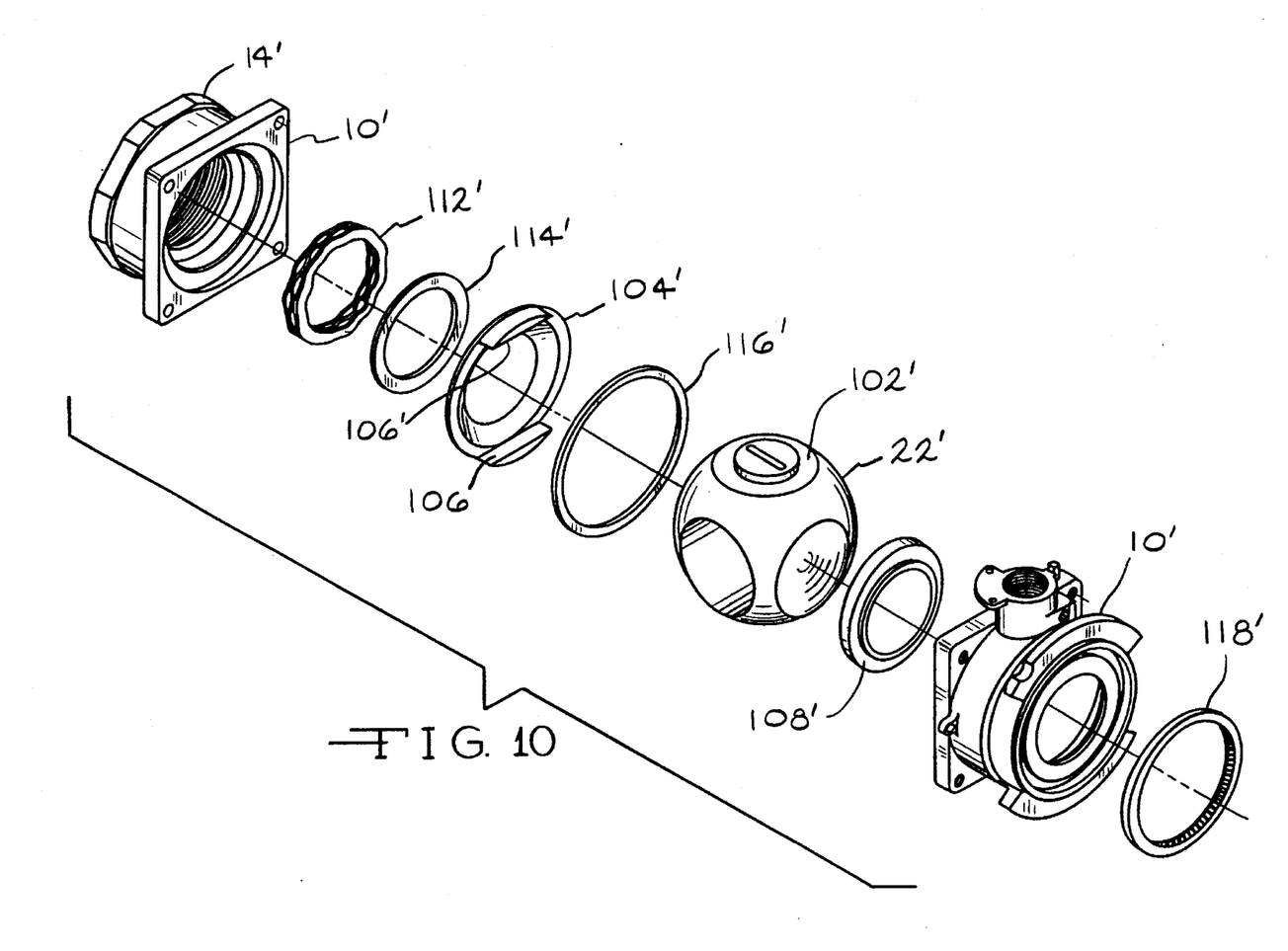
FIG. 10 is an exploded view of the concave coupling half of this invention.

FIG. 10 shows the parts arranged in disassembly order. FIG. 10 especially shows the "flats" of ball valve 22' and retainer 104' in greater detail. Also shown in FIG. 10 are parts which normally accompany ball valve couplings. These parts are spring 112', washer 114', valve seal 116' and valve seal 118'.

We claim:

1. A fluid, ball valve coupling comprising:

a first annular body defining a passage therethrough, a first ball valve rotatably mounted within the passage, the first ball valve including a spherical exterior surface and a bore extending therethrough, means for rotating the first ball valve between an open position when the bore is in alignment with the passage and a closed position when the bore is transversely disposed to the passage;

a second annular body defining a passage therethrough, a second ball valve rotatably mounted within the passage, the second ball valve including a spherical exterior surface and a bore extending therethrough, means for rotating the second ball valve between an open position when the bore is in alignment with the passage and a closed position when the bore is transversely disposed to the passage;

a means for coupling the annular bodies; and a retainer located between the second ball valve and the passage of the second annular body, wherein a portion of the spherical exterior surface of the second ball valve is flat and a portion of the retainer is flat wherein the flats are located adjacent to each other allowing the second ball valve to rotate between the open and closed position, but preventing the second ball valve from otherwise moving in the passage of the second annular body.

2. A fluid coupling according to claim 1, wherein the flats keep the second ball valve on centerline which allows coupling of the two annular bodies without damage to the ball valves.

3. A fluid coupling according to claim 1 wherein the second ball valve has at least two flat surfaces and the retainer has at least two flat surfaces wherein each flat of the retainer is adjacent a flat on the second ball valve.

4. A fluid coupling according to claim 1 wherein the second ball valve has two flat surfaces 180° apart and the retainer is circular and has two flat surfaces 180° apart wherein each flat of the retainer is adjacent a flat on the second ball valve.

5. A fluid ball valve according to claim 1 wherein the second ball valve is a concave ball valve and the first ball valve is a convex ball valve, wherein the concave ball valve has a semi-spherical depression in the spherical exterior surface thereof wherein the convex ball valve fits inside the semi-spherical depression when the ball valves are in the closed position.

6. A fluid ball valve according to claim 1 wherein the ball valves are floating ball valves.

7. A fluid ball valve according to claim 1 wherein the second annular body has a coupling end and the retainer is located on the opposite side of the second ball valve away from the coupling end.

8. A fluid ball valve according to claim 7 including a ball seal that has at least two sealing nibs.

9. A fluid ball valve according to claim 8 wherein the ball seal is a circular seal that has two sealing nibs.

10. A fluid ball valve according to claim 8 wherein the ball seal is located in the passage between the second ball valve and the coupling end of the second annular body.

11. A fluid ball valve according to claim 1 wherein the annular bodies have exteriors and the means for rotating the ball valves include handles disposed adjacent the exterior of the bodies wherein each handle has a convex edge and a concave edge wherein the convex edge of the handle of the means for rotating the first ball valve is adjacent the concave edge of the handle of the means for rotating the second ball valve when the ball valves are in the closed position wherein the means for rotating the first ball valve interferes with the means for rotating the second ball valve when the ball valves are in the closed position.

12. A fluid coupling according to claim 11 wherein the concave edge of the handle of the means for rotating the first ball valve is adjacent the convex edge of the handle of the means for rotating the second ball valve when the ball valves are in the open position, and wherein the means for rotating the second ball valve interferes with the means for rotating the first ball valve when the ball valves are in the open position.

13. A fluid coupling according to claim 11 including an interlocking means to prevent uncoupling of the annular bodies when the first ball valve is in an open position.

14. A fluid coupling according to claim 13 wherein the means for rotating the first ball valve engages the interlocking means so that the interlocking means engages the first annular body and the second annular body when the first ball valve is in an open position.

15. A fluid coupling according to claim 14 wherein the means for rotating the first ball valve prevents the interlocking means from disengaging from the second annular body when the first ball valve is in the open position.

16. A fluid coupling according to claim 11 wherein each handle includes a handle button release and a secondary handle lock wherein the button releases prevent the ball valves from rotating when the ball valves are in the open or closed position and the secondary locks prevent the ball valves from rotating when the ball valves in the closed position and disconnected.

17. A fluid coupling according to claim 16 wherein the handle button releases engage the exterior of the bodies when the ball valves are in the open or closed position and the secondary locks engage the exterior of the bodies when the ball valves are in the closed position and disconnected.

18. A fluid coupling according to claim 16 wherein secondary locks do not engage the housings when the ball valves are in the open position.

\* \* \* \* \*